United States Patent
Otmani et al.

(10) Patent No.: US 10,355,734 B1
(45) Date of Patent: Jul. 16, 2019

(54) ACCESSORY FOR MOBILE DEVICE

(71) Applicant: Telecom Lifestyle Fashion B.V., Tilburg (NL)

(72) Inventors: Mouhssine Otmani, Tilburg (NL); Sebastianus Gerardus Maria Eumelen, Tilburg (NL); Kwun Yin Chan, Kwai Chung (HK)

(73) Assignee: TELECOM LIFESTYLE FASHION B.V., Tilburg (NL)

( * ) Notice: Subject to any disclaimer, the term of this patent is extended or adjusted under 35 U.S.C. 154(b) by 0 days.

(21) Appl. No.: 15/892,132

(22) Filed: Feb. 8, 2018

(51) Int. Cl.
| *H04B 1/3888* | (2015.01) |
| *G06F 1/16* | (2006.01) |
| *H04B 1/40* | (2015.01) |
| *A45F 5/00* | (2006.01) |
| *A45F 5/10* | (2006.01) |

(52) U.S. Cl.
CPC ......... *H04B 1/3888* (2013.01); *G06F 1/1626* (2013.01); *A45F 2005/008* (2013.01); *A45F 2005/1013* (2013.01)

(58) Field of Classification Search
CPC .............. H04B 1/3888; G06F 1/1626; A45F 2005/008; A45F 2005/1013; A45F 2200/0516

USPC ............ 455/90.3, 575.8, 569.1–569.2
See application file for complete search history.

(56) References Cited

U.S. PATENT DOCUMENTS

| 8,374,657 | B2 * | 2/2013 | Interdonato | ............ H04B 1/385 |
| | | | | 379/433.07 |
| 9,300,346 | B2 * | 3/2016 | Hirsch | ................ H04B 1/385 |
| 9,671,064 | B2 * | 6/2017 | Tussy | .................... F16M 13/04 |
| 2012/0267402 | A1 * | 10/2012 | Beatty | ...................... A45F 3/14 |
| | | | | 224/218 |
| 2016/0134733 | A1 * | 5/2016 | Murphy | .................. A45F 5/00 |
| | | | | 455/575.6 |

* cited by examiner

*Primary Examiner* — Lee Nguyen
(74) *Attorney, Agent, or Firm* — Westman, Champlin & Koehler, P.A.; Z. Peter Sawicki; Amanda M. Prose

(57) ABSTRACT

An accessory for a mobile device comprising a cover. The cover comprises a main body for coupling to a rear surface of a mobile device, an elongate member extending adjacent a rear face of the main body, and a retention band extending from the rear face of the main body and peripheral to the elongate member. The elongate member having a distal end and a proximal end and comprising at least a first segment at the proximal end and a second segment at the distal end, the first segment being hingedly attached to the main body at the proximal end.

20 Claims, 11 Drawing Sheets

ACCESSORY FOR MOBILE DEVICE

FIELD OF THE INVENTION

The present invention relates to accessories for mobile devices, and particularly to supports for mobile devices.

BACKGROUND ART

Hand held mobile devices, such as mobile telephones, devices for playing digital audio files and tablets and the like, typically have a front face comprising a display screen and a means for the user to interact with the device. The interaction means may be provided in the form of buttons or wheels, or may be provided as an integral touch sensitive display screen or as a combination of these. These are most commonly located on the front face or on edges of the device for convenience.

Many hand held mobile device users employ a casing or cover to partially or completely cover the mobile device to protect said device from damage caused by wear and tear and/or the mobile device being dropped. Covers are particularly desirable for mobile devices whose components are likely to shatter or break, resulting in costly repairs or necessitating replacement of the mobile device as a whole.

The range of uses for mobile devices has increased with the range of applications available for use on mobile devices. A single mobile device may typically be used as a music player, telephone, messaging centre, satellite navigation aid, photo or video display device, and e-reader. It is therefore increasingly important for a user to be able to securely retain the mobile device in his/her hand in a range of situations and environments.

Many known covers include a support intended to aid retention of the mobile device in the users hand while the mobile device is in use, particularly while the user is partaking in sport or other physical activity. Some covers, such as that disclosed in U.S. Pat. No. 9,300,346, have supports with convertible configurations that allow the mobile device to function as a table top device in addition to aiding retention in the users hand when functioning as a hand held device.

SUMMARY OF THE INVENTION

It is an object of the present invention to provide a configurable support for a mobile device that both aids retention of said device in a user's hand and allows the mobile device to be used as a table top device.

In a first aspect, the present invention provides a support for a mobile device, the support suitable for attachment to a rear surface of a mobile device, the support comprising a backplate for coupling to a rear surface of a mobile device, and an elongate member extending in a longitudinal direction adjacent the backplate. The elongate member has a distal end and a proximal end and comprises at least a first segment at the proximal end and a second segment between the first segment and the distal end. The first segment is hingedly attached to the backplate at the proximal end.

The second segment preferably comprises a distal portion and a proximal portion between the distal portion and the first segment. The distal portion and the proximal portion may be hingedly attached. The proximal portion and the first segment may be hingedly attached.

The distal end of the second segment is preferably retained at a fixed position on the backplate. The distal end of the second segment may be hingedly attached to the backplate at the fixed position.

The support may further comprise longitudinal retention portions to which the distal end of the second segment may be hingedly attached.

The longitudinal retention portions are preferably formed as thickened portions in longitudinal edges of a retention band. The longitudinal retention portions may comprise a protrusion extending toward the elongate member for retaining the second segment adjacent the backplate.

The first and second segments may be spaced away from the backplate when the elongate member is in a first open configuration.

The distal portion may be retained parallel to the backplate and at an acute angle to the proximal portion when the elongate member is in a second open configuration.

Preferably, the longitudinal retention portions retain the distal portion parallel to the backplate when the elongate member is in a second open configuration.

Preferably, the longitudinal retention portions retain the proximal portion parallel to the backplate and the distal portion when the elongate member is in a closed configuration.

The backplate may be a contiguous member. Preferably, the backplate extends longitudinally between the proximal end of the elongate member and the fixed position. The backplate may extend laterally the width of the elongate member.

The retention band may define a periphery of the backplate. Preferably, the backplate extends over substantially the rear surface of a mobile device. The backplate may be a cover for a mobile device.

Preferably, the distance between the proximal end of the elongate member and the distal end of the elongate member is substantially equal to the combined lengths of the first segment and the proximal portion of the second segment.

Preferably, the distance between the proximal end of the elongate member and the fixed position is substantially equal to the combined lengths of the first segment and the proximal portion of the second segment less the length of the distal portion.

BRIEF DESCRIPTION OF THE DRAWINGS

An embodiment of the present invention will now be described by way of example, with reference to the accompanying figures in which.

DETAILED DESCRIPTION OF THE EMBODIMENTS

Figure 1:
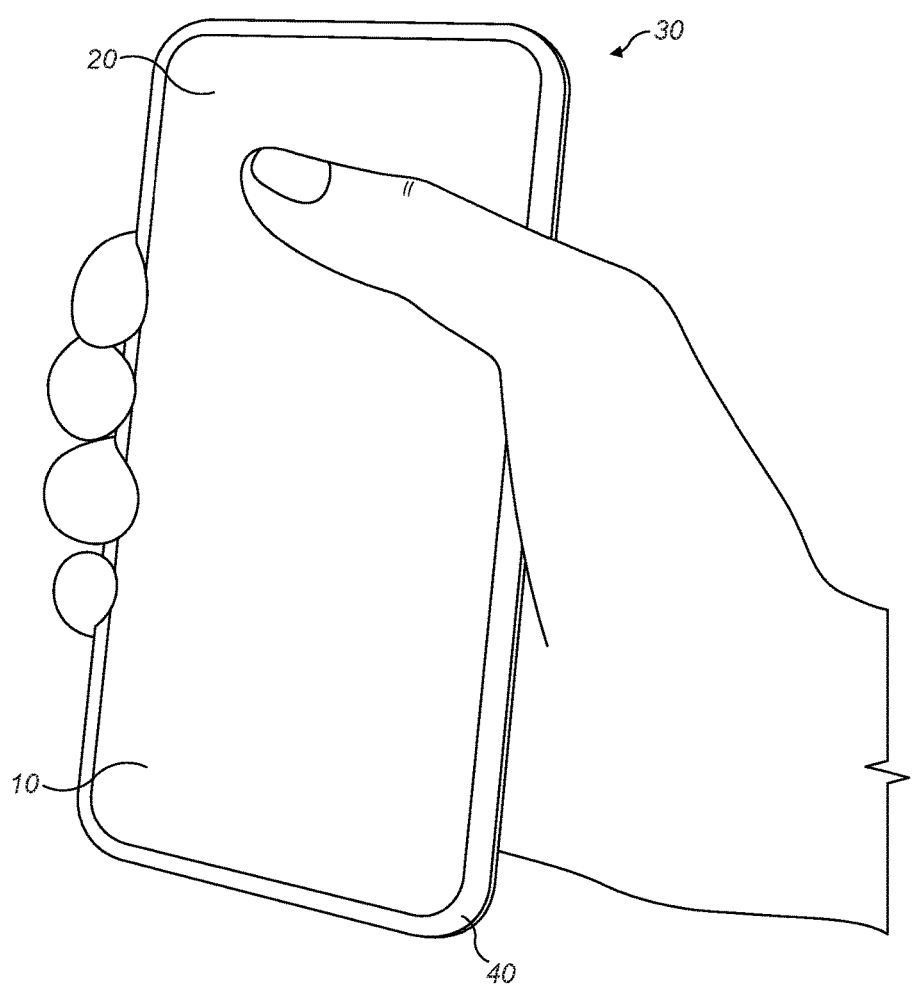
FIG. 1 shows an isometric view of an exemplary mobile device in use.
Figure 2:
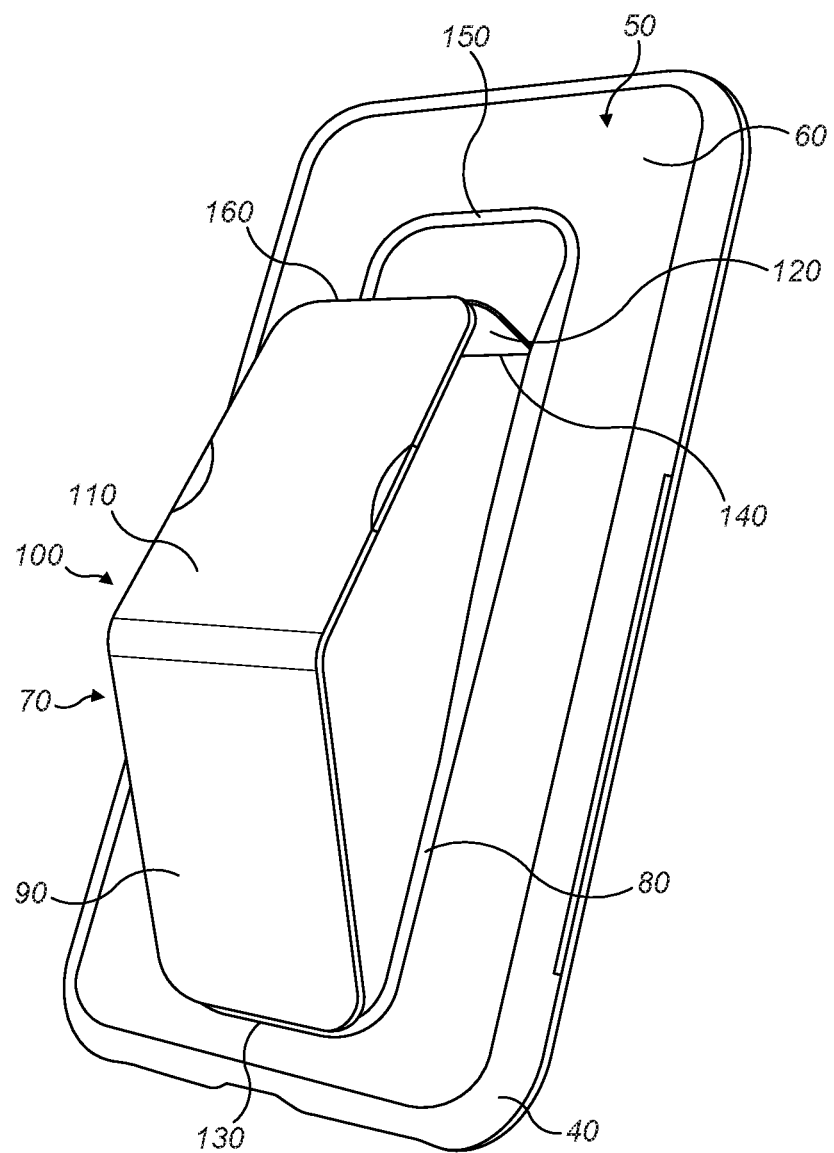
FIG. 2 shows an isometric view of a support for a mobile device in accordance with an embodiment of the invention in which the elongate member is in a first open configuration.

FIGS. 1 and 2 show an exemplary mobile device in use. It is customary for a user to hold a mobile device 10 such that the forward facing display screen 20, in this embodiment a touch screen, is facing the user to allow user interaction. In the present embodiment, the support is shown as having a backplate 50 extending over the rear surface of the mobile device to form a cover 30 for a mobile device. The backplate 50 has an edge portion 40 extending over the peripheral edges of the mobile device to complete cover 30.

A cover, as referred to herein, is defined as a device for covering and/or protecting a mobile device. The mobile device may be any tablet device, including a telephone, but is not limited to such.

FIG. 2 shows the backplate 50 with elongate member 70 extending adjacent the rear face 60 of backplate 50. Elongate member 70 is comprised of a first segment 90 and a second segment 100. The second segment 100 itself comprises a proximal portion 110 and distal portion 120, the proximal portion 110 being located between the first segment 90 and the distal portion 120.

The proximal portion 110 and the distal portion 120 are hingedly connected to permit relative movement between them. Likewise, first segment 90 and second segment 100 are hingedly connected. Elongate member 70 is affixed to backplate 50 along the extent of its width at a proximal end 130 in a hinged manner to allow relative movement between the elongate member 70 and the backplate 50.

The elongate member is generally in a flat, rigid planar shape and hinged attachments are formed at its section ends across its width. This means the member is inherently resistant to sideways movement or rotation, and also that it folds flat. However, other arrangements are possible and may be preferred, such as for cosmetic reasons. Individual sections (such as the distal portion 120, for example) may be of a different construction, such as a length of elastic band.

In alternative embodiments the first segment 90 and second segment 100, the proximal portion 110 and distal portion 120, and/or elongate member 70 and backplate 50 may be connected by other materials or methods permitting relative movement sufficient for the elongate member 70 to be transposed from one configuration to another. The first segment 90 and the proximal portion 110 may be formed of a single continuous segment or of discrete segments, as may the backplate 50 and elongate member 70.

A retention band 80 extending from rear face 60 of backplate 50 defines a space for accommodating elongate member 70. In the configuration shown in FIG. 2, retention band 80 is immediately adjacent the first segment 90 at proximal end 130. In the present embodiment, retention band 80 is formed on rear face 60; however in further embodiments, retention band 80 may be formed as an integral part of backplate 50.

The distal end of distal portion 120 is affixed to backplate 50 at a fixed position 140. The distal portion 120 is attached along the extent of its width in a hinged manner to allow relative movement between the distal portion 120 and backplate 50.

In the present embodiment, the elongate member 70 is formed of a rigid material with areas of reduced cross sectional area permitting relative movement between the first segment 90, the second segment 100, and the proximal 110 and distal 120 portions of the latter. The elongate member 70 is comprised of a different material to that of backplate 50. In alternative embodiments, backplate 50 and elongate member 70 may be formed of the same material.

Figure 3:
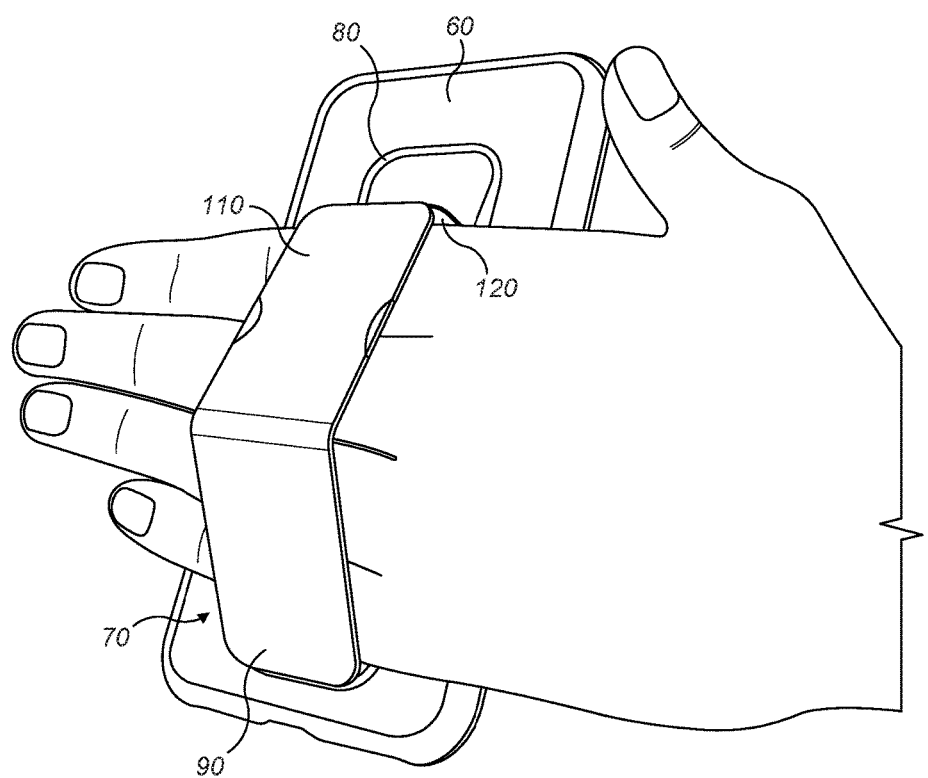
FIG. 3 shows a method of using the support for a mobile device in the configuration of FIG. 2.

FIG. 3 shows elongate member 70 in use in a first open configuration. Said configuration facilitates enhanced retention in the users hand to prevent the mobile device from being dropped or slipping from the hand, particularly while the user is active (for example, exercising) or if the user is of reduced dexterity.

Figure 4:
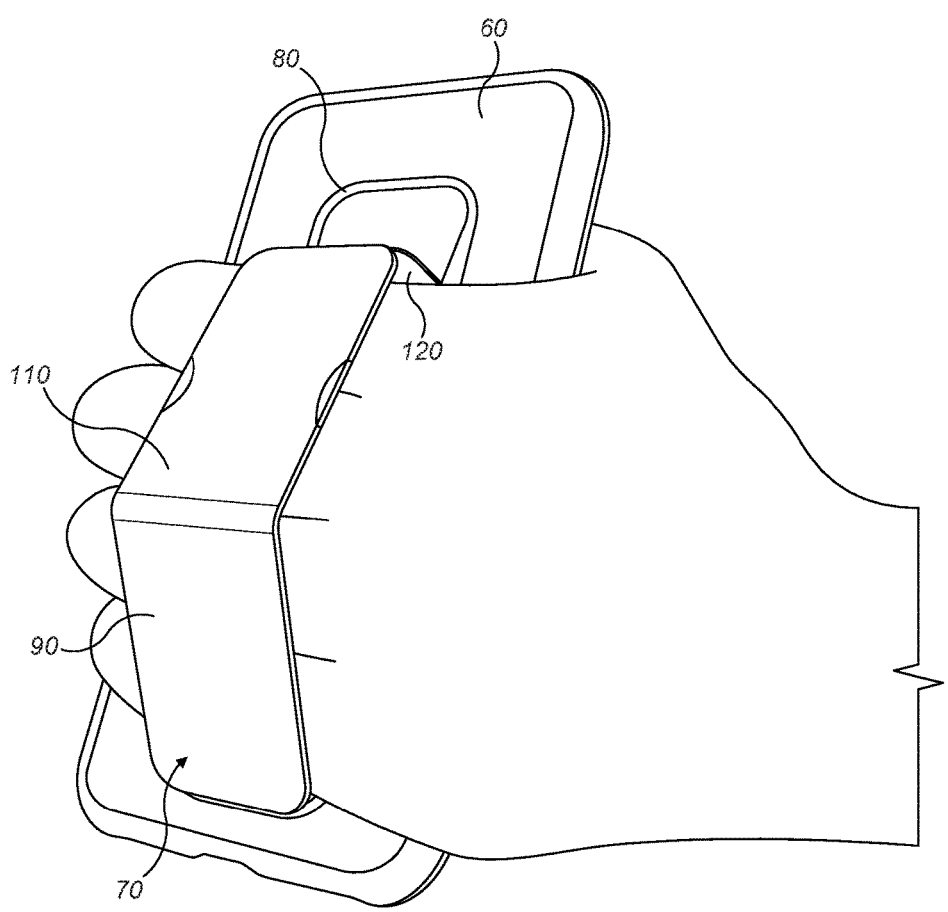
FIG. 4 shows the support for a mobile device in the first open configuration of FIG. 2 in use.

The hinged attachments at proximal end 130 and fixed position 140 allow the elongate member 70 to move away from the rear face 60 to accommodate the users fingers, which are placed between the elongate member 70 and the rear face 60 of backplate 50, thus securing the mobile device 10 to the users hand. FIG. 4 shows the user subsequently gripping the mobile device 10 for increased security.

Figure 5:
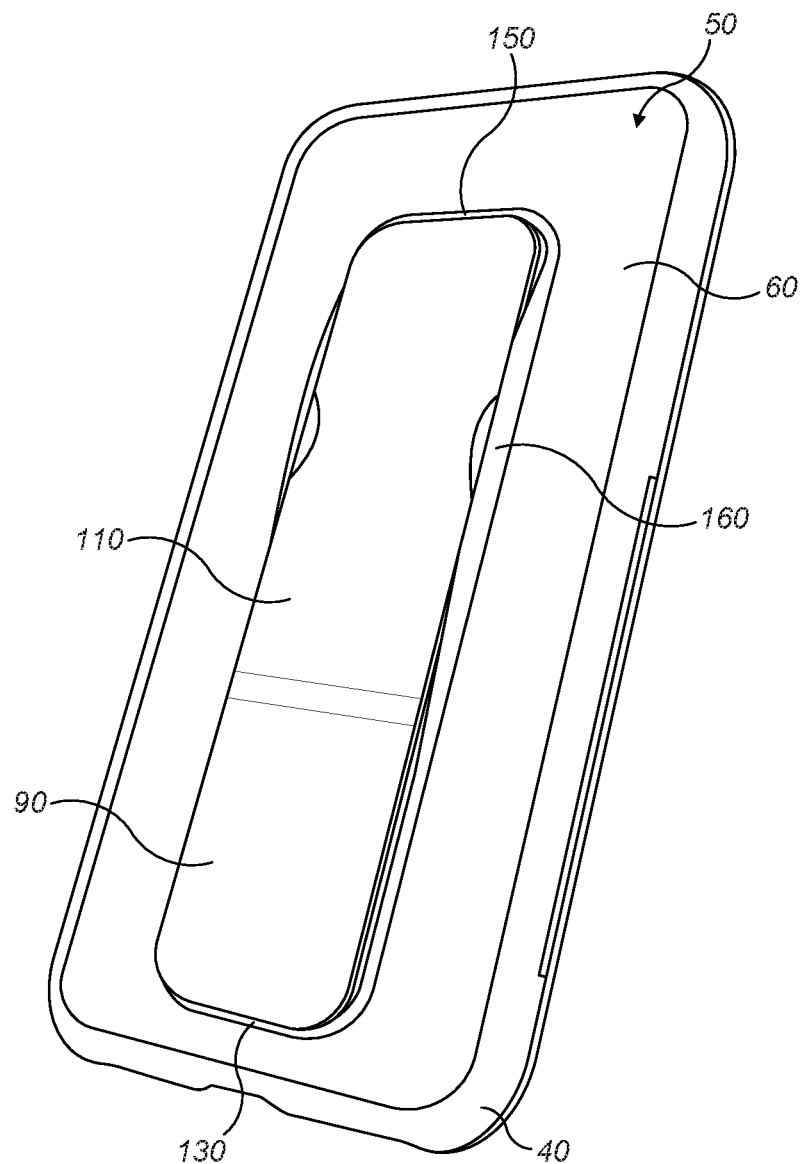
FIG. 5 shows a support for a mobile device in accordance with an embodiment of the invention in which the elongate member is in a closed or stowed configuration.

When secure retention of the mobile device to the users hand is not required, the elongate member 70 may be transposed to a closed or stowed configuration, as shown in FIG. 5, in which elongate member 70 lies flat against and parallel to the rear surface 60 of backplate 50. Distal portion 120 of second segment lies between the rear face 60 of backplate 50 and the proximal portion 110. First segment 90 and proximal portion 110 are aligned, with proximal portion 110 partially overlying distal portion 120. The retention band 80 extends around the periphery of the elongate member such that retention band 80 contacts the proximal end of the first segment 90 and the distal end of proximal portion 110 at the distal end 150 of retention band 80. The distance between proximal end 130 and distal end 150 of retention band 80 is substantially equal to the combined length of first segment 90 and proximal portion 110.

Likewise, the distance between the proximal end 130 and the fixed position 140 is substantially equal to the length of the first segment 90 and proximal portion 110 less the length of the distal portion 120. In this way, the elongate member 70 can lay flat against and parallel to the rear face 60 of backplate 50 when closed or stowed.

Figure 6:
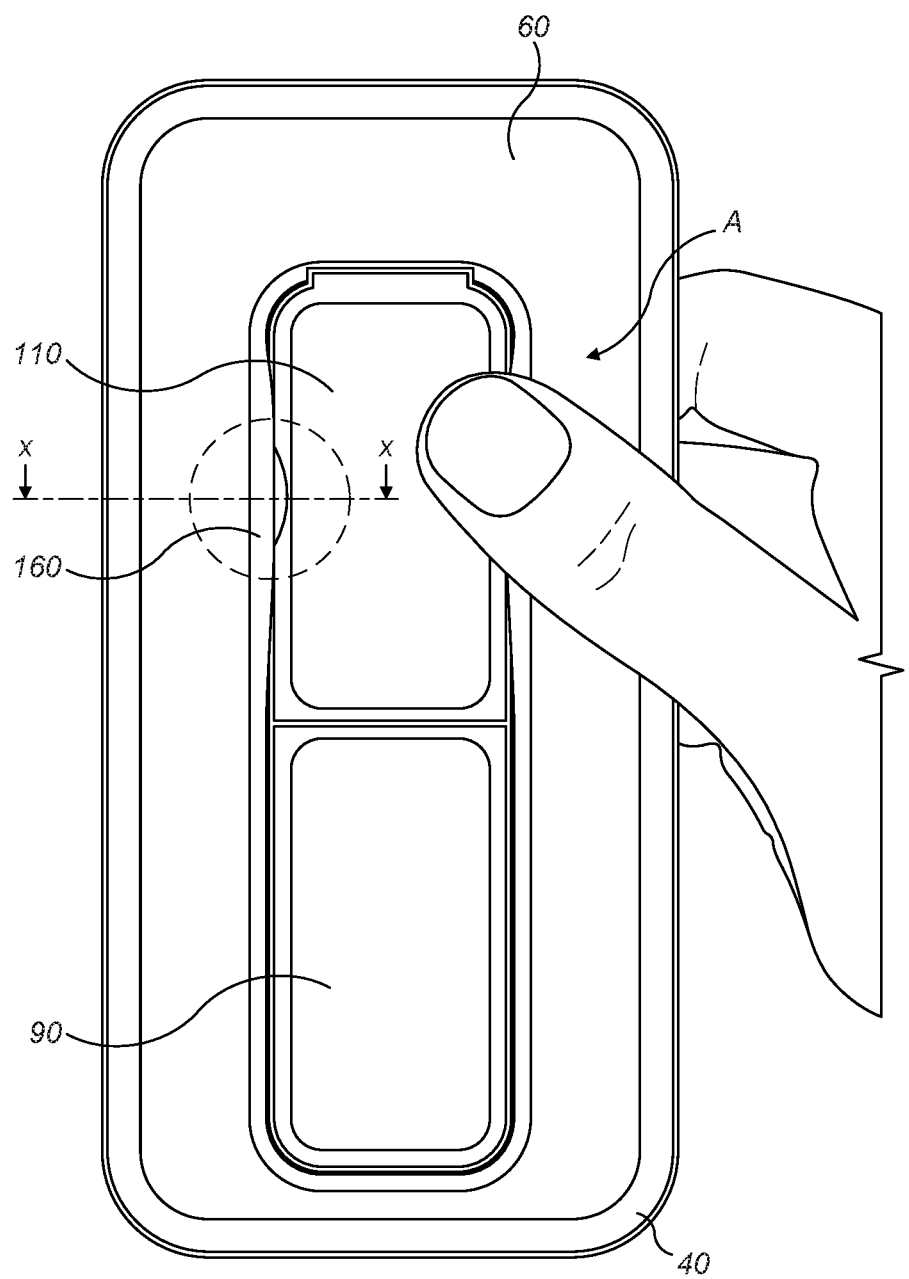
FIG. 6 schematically represents a method of placing the support for a mobile device in accordance with an embodiment of the invention in a stowed configuration.

The elongate member 70 is placed in the stowed position from the first open configuration by the user exerting pressure on the proximal portion 110 in the direction of arrow A shown in FIG. 6. First segment 90 and proximal portion 110 become co-planar, their combined periphery being enclosed by retention band 80. Elongate member 70 is retained in place by retention band 80, which comprises longitudinal retention portions 160 along at least part of its longitudinal edges.

Figure 7:
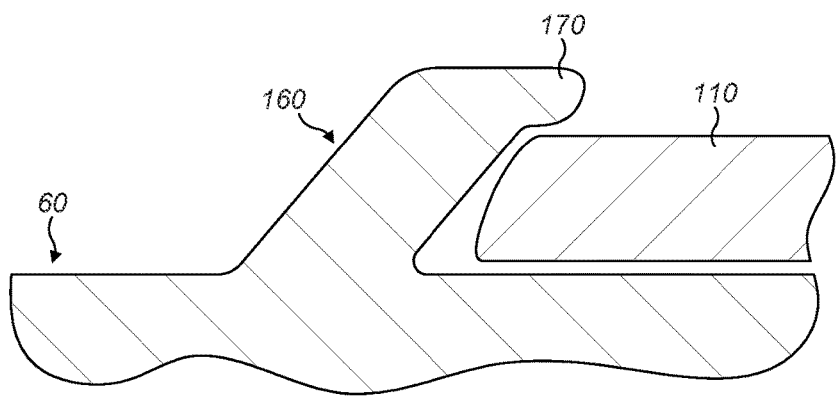
FIG. 7 shows a partial cross-section through the retention band of the support along line x-x.

In the present embodiment, longitudinal retention portion 160 is positioned such that it is adjacent the proximal portion 110 within the retention band 80 when the elongate member 70 is in the stowed position. The or each longitudinal retention portion 160 comprises a protrusion 170 extending from the longitudinal retention portion 160 toward the proximal portion 110, as shown in FIG. 7, which illustrates a partial section through the support at line x-x as indicated in FIG. 6. In the stowed position, longitudinal retention portions 160 overlie the edges of the proximal portion 110 to retain the proximal portion 110 in position. These provide a "clip" arrangement that engages with the side edges of the relevant part of the retention band 80. Other ways of holding the retention band in a desired configuration are possible, such as hook-and-loop fasteners engaging with a rear face of the retention band 80, press studs, or other mechanical retention methods.

Figure 8:
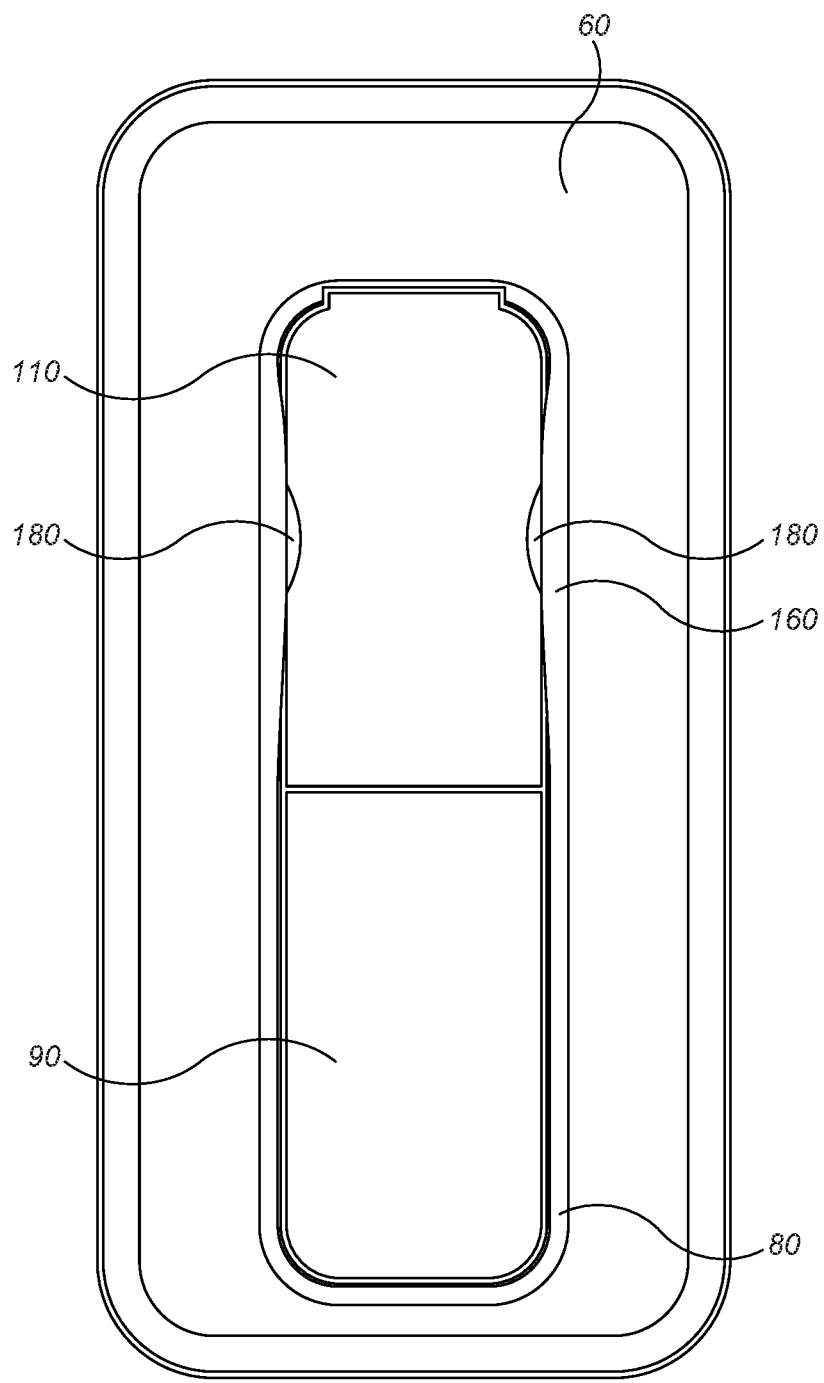
FIG. 8 shows a rear view of a support for a mobile device in accordance with an embodiment of the invention in a stowed configuration.

Tabs 180, as shown in FIG. 8, are provided for releasing the elongate member 70 from protrusion 170 thus allowing the user to transpose the elongate member 70 from the stowed position to the first open position.

The retention band is preferably formed of a polymer having sufficient resilience to enable the elongate member to be repeatedly reconfigured to and from a stowed position according to user preference.

Figure 9:
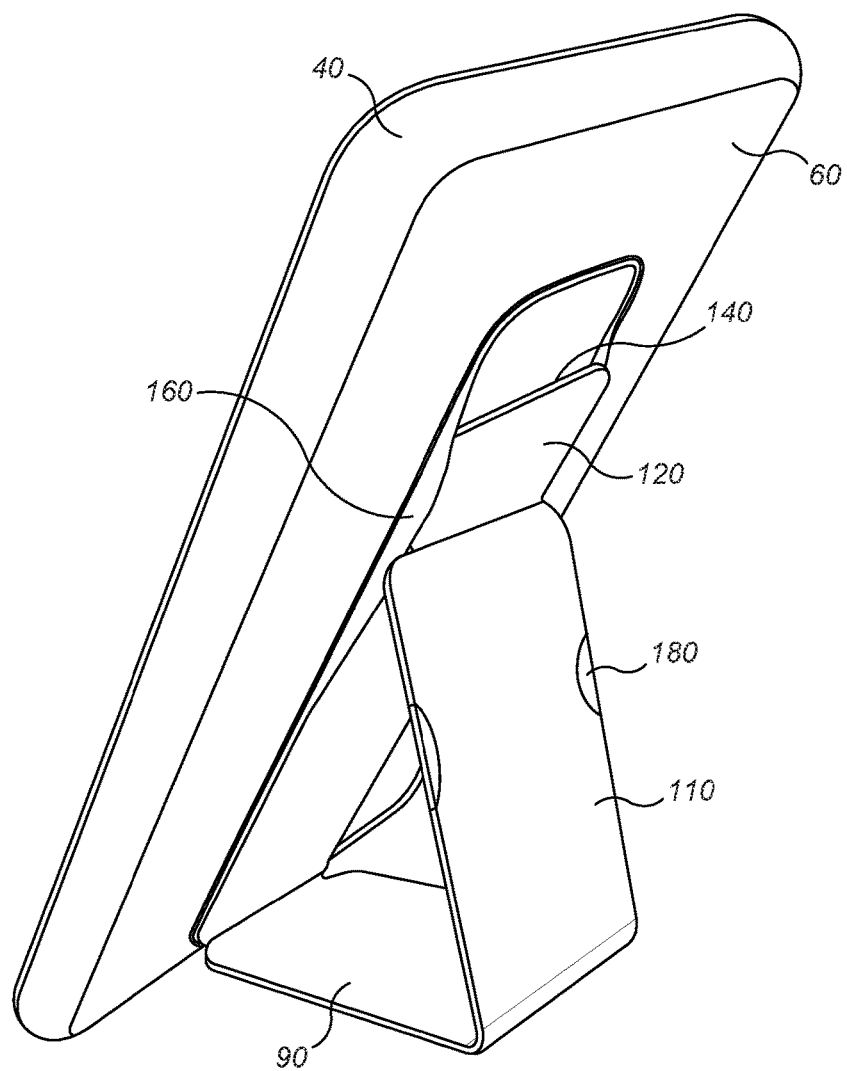
FIG. 9 shows an isometric view of a support for a mobile device in accordance with an embodiment of the invention in which the elongate member is in a second open configuration.
Figure 10:
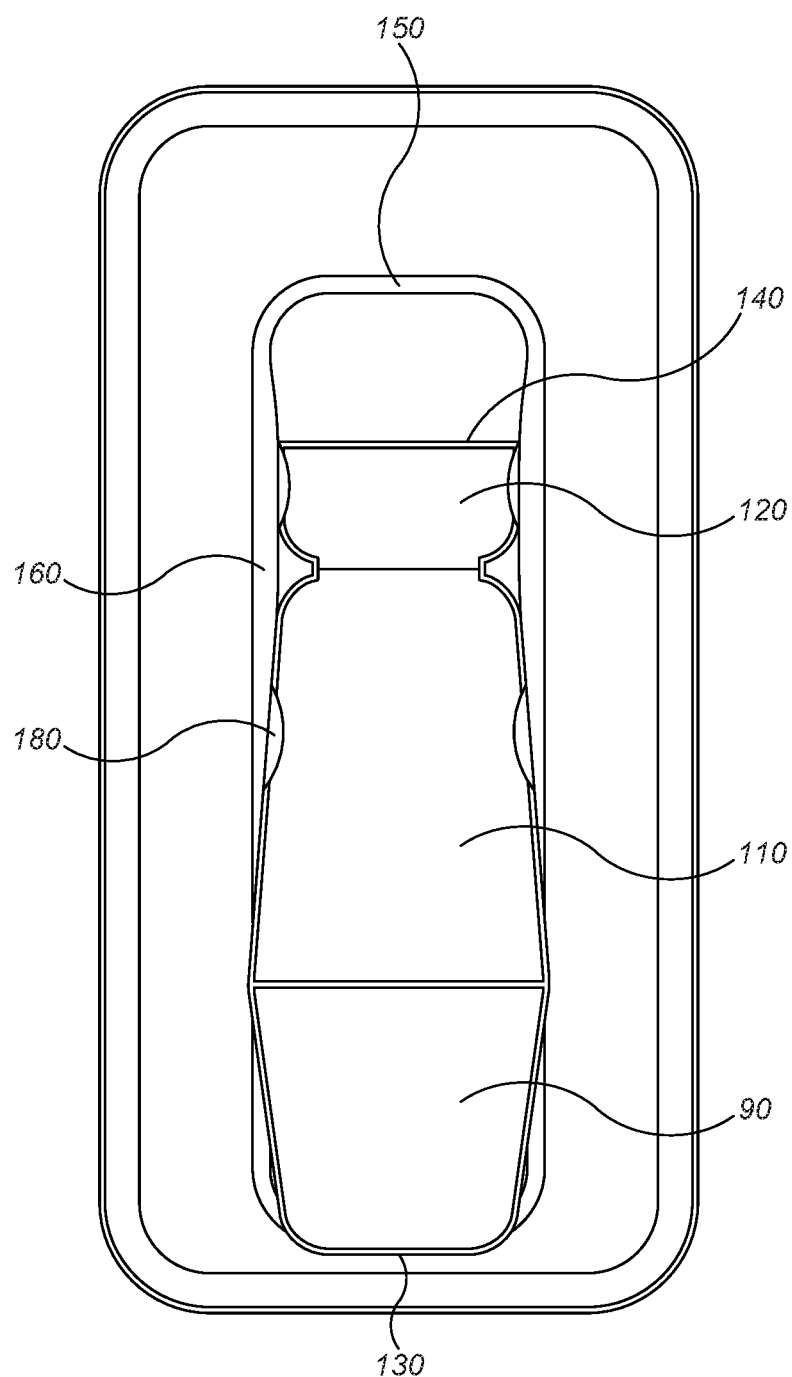
FIG. 10 shows a rear view of a support for a mobile device in the configuration of FIG. 9.

FIGS. 9 and 10 show the support in use in a second open configuration that allows the user to rest the mobile device 10 on a surface in such a manner that display screen 20 can be viewed without the user holding the mobile device 10. Distal portion 120 is retained adjacent to and parallel with rear face 60 by protrusion 170 of longitudinal retention portion 160. In the present embodiment, the longitudinal retention portion 160 is positioned such that it is adjacent the distal portion 120 within the retention band 80 when the elongate member 70 is in the second open position. The longitudinal retention portions 160 extend at least partially adjacent the fixed position 140.

FIG. 9 shows the device resting in a "portrait" format, but it will be appreciated that the width of the elongate member is adequate to support the device in a "landscape" format. Alternatively, the device may be affixed to a mobile device such that the device rests in a "landscape" format.

The proximal portion 110 extends from the distal portion 120 to the first segment 90, the latter being at an acute angle to rear face 60 such that a part of the first segment 90 may rest upon a surface, such as a table top. In the present embodiment, the portion of the first segment 90 adjacent the proximal portion 110 rests upon a surface. However, should the support be affixed to a mobile device further toward the edges of the mobile device, the substantially the entirety of the first segment 90 may rest on said surface. The distance from the distal end 150 of retention band 80 to fixed position 140 is substantially equal to the length of distal portion 120. The relative lengths of the proximal portion 110 and first segment 90 are selected to produce a resultant angle of the display screen relative the first segment 90 and thus the horizontal surface on which the mobile device rests.

Figure 11:
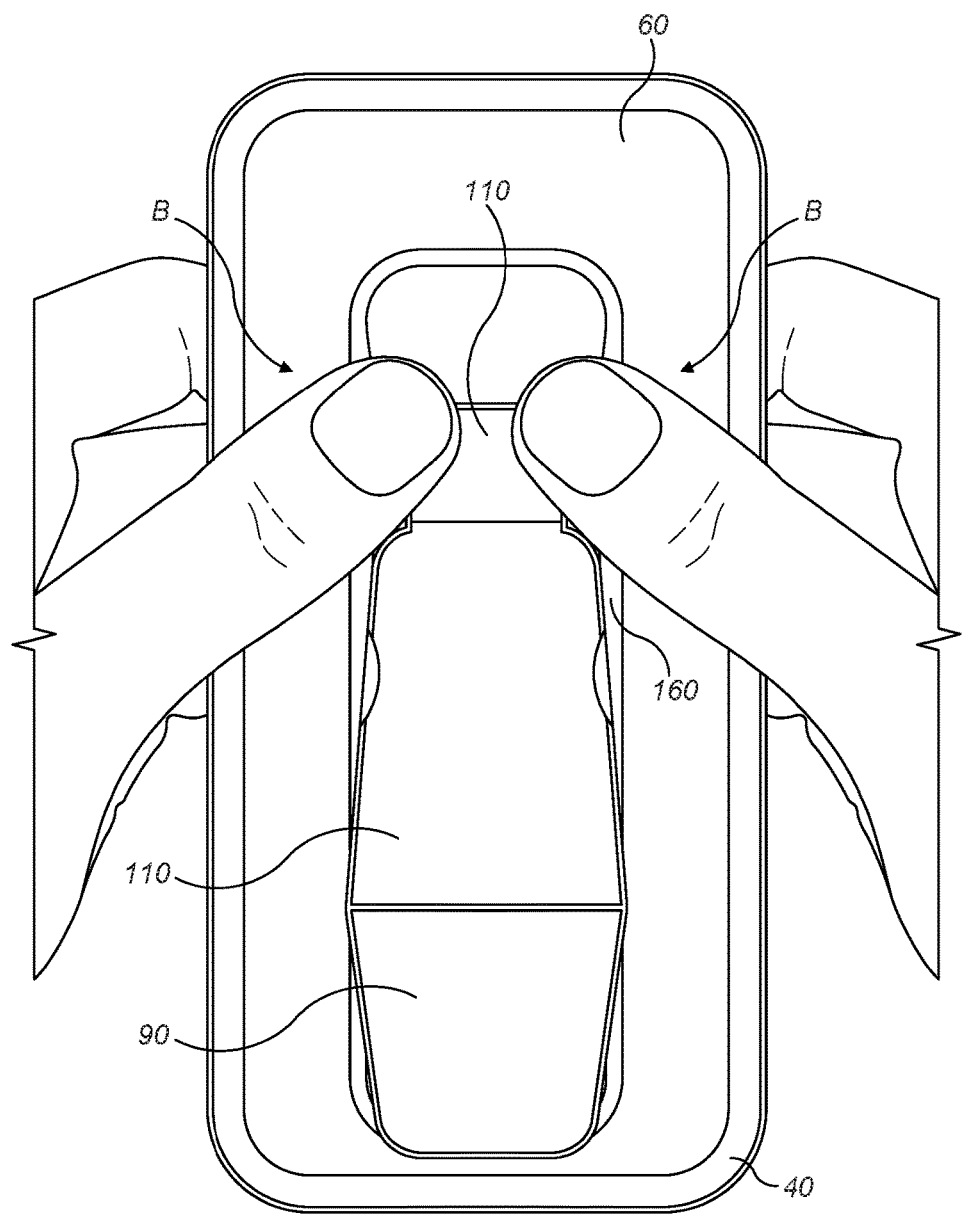
FIG. 11 schematically represents a method of placing the support for a mobile device in accordance with an embodiment of the invention in a second open configuration.

FIG. 11 schematically represents a method of placing the elongate member 70 in the second open position. The elongate member 70 is placed in position by the user exerting pressure on the distal portion 120 in the direction of arrows B shown in FIG. 11. The distal portion 120 may subsequently be released from protrusion 170 by the user, typically by pulling the proximal portion 110 and/or first segment 90, or by pulling on tabs 180, or otherwise. The configuration may thus be transposed to that of the first open position as shown in FIGS. 2 to 4, or into the stowed position as shown in FIGS. 5 to 8.

It will of course be understood that many variations may be made to the above-described embodiment without departing from the scope of the present invention.

In an alternative embodiment, the distal portion 120 may be comprised of a resilient member. Use of a resilient member would provide the advantage of a hand space of adjustable size and may bias the elongate member 70 against the hand, thus providing increased retention of the mobile device in the user's hand. The distal portion 120 may be a band extending between the proximal portion 110 and the fixed position 140.

In a further alternative embodiment, retention band 80 may be replaced by discrete longitudinal retention portions 160, the longitudinal retention portions 160 substantially as depicted herein.

In a further embodiment, the distal portion 120 may be slidably retained within the retention band 80. The distal portion 120 may be slidably affixed within the retention band 80 to permit longitudinal movement between fixed position 140 and the distal end 150 of retention band 80.

In alternative embodiments, the elongate member 70 is attached to rear face 60 at discrete points along its end rather than along the extent of its width at proximal end 130. Likewise, distal portion 120 may be similarly attached at fixed position 140.

In alternative embodiments, when the elongate member 70 is in the second open position, the proximal portion 110 may be retained by [insert means]. When in the closed or stowed position, the distal portion 120 may be retained adjacent the backplate 50 by [insert means].

In addition, the invention has been described with reference to an embodiment in which it is incorporated into a mobile phone case. Such cases, or covers, are well-known and attach to the device in a variety of ways; the particular nature of the case is not especially germane to the invention.

Indeed, the invention could be embodied as a stick-on or otherwise attachable pad which could be affixed to devices without a case, or added to an existing case. In such an embodiment, the backplate 50 occupies the space between the proximal end 130 and the fixed position 140 to support the first segment 90 and the area of the proximal portion 110 overlying the insert. The backplate 50 may also be dimensioned such that it partially or fully fills the space between the longitudinal edges of the retention band 180.

The support may be permanently or removably attached to a mobile device by adhesive, known hook and loop fastenings, or any other suitable means.

In a yet further embodiment, the backplate 50 may extend across the rear surface of a mobile device to substantially the cover the rear surface with the exception of the area between the proximal end 130 and the fixed position 140. The space between the proximal end 130 and the fixed position 140 may be a void, or it may be occupied by a separate insert (not shown) to support the first segment 90 and the area of the proximal portion 110 overlying the insert. The insert may be dimensioned such that it partially or fully fills the space between the longitudinal edges of the retention band 180.

The invention claimed is:

1. A support for a mobile device, the support suitable for attachment to a rear surface of a mobile device, the support comprising:
    a backplate for coupling to a rear surface of a mobile device,
    an elongate member extending in a longitudinal direction adjacent the backplate, the elongate member having a distal end and a proximal end and comprising at least a first segment at the proximal end and a second segment between the first segment and the distal end, the first segment hingedly attached to the backplate at the proximal end, and
    longitudinal retention portions formed as thickened portions in longitudinal edges of a retention band.

2. The support for a mobile device according to claim 1, wherein the second segment comprises a distal portion and a proximal portion between the distal portion and the first segment.

3. The support for a mobile device according to claim 2, wherein the distal portion and the proximal portion are hingedly attached.

4. The support for a mobile device according to claim 2, wherein the proximal portion and the first segment are hingedly attached.

5. The support for a mobile device according to claim 2, wherein the distal portion is retained parallel to the backplate and at an acute angle to the proximal portion when the elongate member is in a second open configuration.

6. The support for a mobile device according to claim 5, wherein the longitudinal retention portions retain a distal portion parallel to the backplate when the elongate member is in a second open configuration.

7. The support for a mobile device according to claim 2, wherein the longitudinal retention portions retain the proximal portion parallel to the backplate and the distal portion when the elongate member is in a closed configuration.

8. The support for a mobile device according to claim 2, wherein the distance between the proximal end of the elongate member and the distal end of the elongate member is substantially equal to the combined lengths of the first segment and the proximal portion of the second segment.

9. The support for a mobile device according to claim 1, wherein the distal end of the second segment is retained at a fixed position on the backplate.

10. The support for a mobile device according to claim 9, wherein the distal end of the second segment is hingedly attached to the backplate at the fixed position.

11. The support for a mobile device according to claim 9, wherein the distance between the proximal end of the elongate member and the fixed position is substantially equal to the combined lengths of the first segment and the proximal portion of the second segment less the length of the distal portion.

12. The support for a mobile device according to claim 1, wherein a distal end of the second segment is hingedly attached to the longitudinal retention portions at a fixed position on the backplate.

13. The support for a mobile device according to claim 1, wherein the longitudinal retention portions comprise a protrusion extending toward the elongate member for retaining the second segment adjacent the backplate.

14. The support for a mobile device according to claim 1, wherein the first and second segments are spaced away from the backplate when the elongate member is in a first open configuration.

15. The support for a mobile device according to claim 1, wherein the backplate is a contiguous member.

16. The support for a mobile device according to claim 1, wherein the backplate extends longitudinally between the proximal end of the elongate member and a fixed position.

17. The support for a mobile device according to claim 16, wherein the backplate extends laterally the width of the elongate member.

18. The support for a mobile device according to claim 1, wherein the retention band defines a periphery of the backplate.

19. The support for a mobile device according to claim 1, wherein the backplate extends over substantially the rear surface of a mobile device.

20. The support for a mobile device according to claim 1, wherein the backplate is a cover for the mobile device.

* * * * *